No. 855,540.  
PATENTED JUNE 4, 1907.
J. P. STENSTROM.  
PAIL CLAMP.  
APPLICATION FILED AUG. 6, 1906.
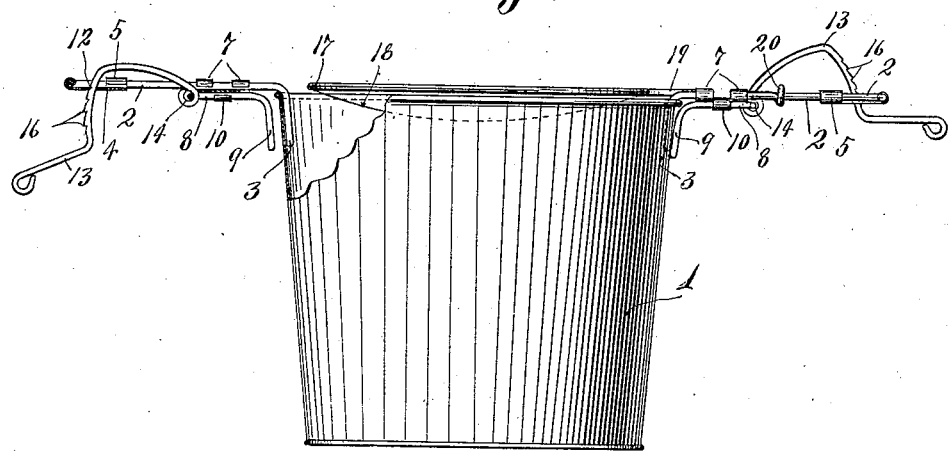
Fig. 1
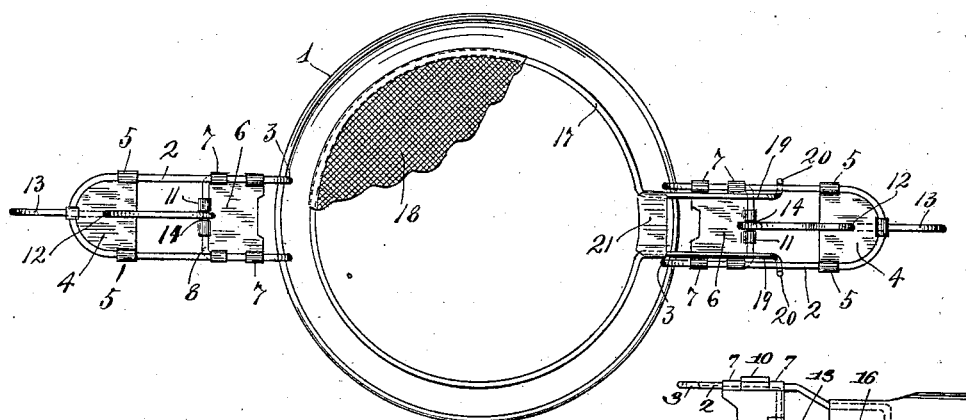
Fig. 2
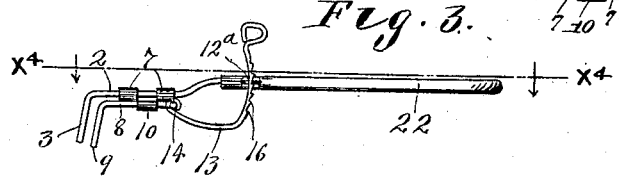
Fig. 3.
Fig. 4.
Witnesses  
a. H. Opsahl  
N. D. Kilgore
Inventor  
J. P. Stenstrom  
By his Attorneys  
Williamson Merchant
THE NORRIS PETERS CO., WASHINGTON, D. C.

UNITED STATES PATENT OFFICE.

JOHN P. STENSTROM, OF BRUNSWICK, MINNESOTA, ASSIGNOR OF ONE-THIRD TO ANDREW M. ANDERSON AND ONE-THIRD TO ANTON PETERSON, BOTH OF MORA, MINNESOTA.

PAIL-CLAMP.

No. 855,540.　　　　Specification of Letters Patent.　　　　Patented June 4, 1907.

Application filed August 6, 1906. Serial No. 329,289.

*To all whom it may concern:*

Be it known that I, JOHN P. STENSTROM, a citizen of the United States, residing at Brunswick, in the county of Kanabec and State of Minnesota, have invented certain new and useful Improvements in Pail-Clamps; and I do hereby declare the following to be a full, clear, and exact description of the invention, such as will enable others skilled in the art to which it appertains to make and use the same.

My invention has for its object to provide an improved clamp especially adapted for holding milk pails, but adapted also for other uses, and to this end it consists of the novel devices and combination of devices hereinafter described and defined in the claims.

The invention is illustrated in the accompanying drawings, wherein like characters indicate like parts throughout the several views.

Referring to the drawings: Figure 1 is a view in side elevation with some parts broken away, and some parts in section showing a pair of my improved clamps applied to a milk pail, and showing also a strainer detachably applied to one of the clamps. Fig. 2 is a plan view of the parts shown in Fig. 1, some parts being broken away. Fig. 3 is a detailed view in side elevation showing a clamp of slightly modified form with some parts broken away; and Fig. 4 is a plan view taken on the line $x^4$ $x^4$ of Fig. 3.

The numeral 1 indicates a milk pail of the usual or any suitable construction, into which, as shown, two of the improved clamps are applied at diametrically opposite points.

Each of the clamps shown in Figs. 1 and 2 is constructed as follows:

The numeral 2 indicates an approximately U-shaped rod, the ends of which are bent downward to form clamping prongs or jaws 3. In the arch or bowl of the U-shaped rod 2 is secured a bearing plate 4, which, as shown, is provided with lips 5 that are bent around the said rod to rigidly secure the same in position.

The numeral 6 indicates a sliding plate which has upturned lips 7 and works slidingly on the prongs of the U-shaped rod 2.

The numeral 8 indicates a shorter U-shaped rod the ends of which are turned downward to form clamping prongs or jaws 9 that co-operate with the respective prongs or jaws 3. The sliding plate 6 is provided with down turned side and end lips 10 and 11 respectively that are bent around the relatively short U-shaped rod 8 and thereby rigidly connects said sliding plate 6 and rod 8.

The bearing plate 4 is provided with a central perforation 12, through which works a cam lever 13 which, at its forward end, is pivotally connected at 14 to the transverse portion of the sliding U-shaped rod 8. The lever 13 is a crooked lever, and that portion thereof which works through the perforation 12 of the bearing plate 4 extends eccentrically to the axis of the pivotal connection 14, so that by upward and downward movements of the free end of said lever 13, the sliding plate 6 and rod 2 may be positively moved toward and from the clamping prongs or jaws 3 of the rod 2. When the said cam lever is moved upward, the clamping prongs 9 of the rod 8 will be forced toward the clamping jaws 3 of the rod 2, and the co-operating jaws 3 and 9 may be caused to tightly clamp the edge of the pail, or other similar article to which the clamp is applied. When the said lever 13 is moved downward, the clamping jaws 9 will be moved away from the clamping jaws 3, and the device may then be easily removed from the pail.

To secure the lever 13 in differently set adjustments, it is provided with ratchet teeth 16 on the outer surface of its eccentric portion 12, and which teeth engage with the bearing plate 4 under the spring tension of the crooked portion of said lever. When the lever 13 is moved upward the teeth 16 thereof automatically engage with the plate 4, and said teeth may be readily disengaged from said plate by downward pressure on the free end of said lever.

When two of the clamps are applied to a milk pail, as shown in Figs. 1 and 2, and the said clamps are rested upon the knees, the pail may be firmly held while milking.

In milking it is desirable to use a strainer, and to hold the strainer in position over the top of the pail; hence I provide a desirable strainer comprising a curved rod 17 to which is applied a straining cloth or material 18 shown in Figs. 1 and 2. The curved rod 17 is provided with a pair of closely positioned approximately parallel arm extensions 19 that terminate in outwardly and upwardly bent hooks 20. As shown, the arms 19 at their inner extremities are connected by a tie plate 21. The arms 19 are so spaced that they are adapted to rest upon a sliding plate 6 of one of the clamps, with their hooks 20 engaged under the intermediate portions of the jaws of the U-shaped rod 2, as shown in Figs. 1 and 2. In this way the strainer is adapted to be detachably held in working position on one of the clamps, and at the same time the action of the clamp does not interfere with it.

The construction of the device shown in Fig. 3 is similar to that above described, but an extended handle 22 is rigidly secured to the bow of the U-shaped rod 2, and the cam lever 13 is extended upward through a perforation 12ª in the inner reduced portion of the handle 22. The lever 13 is secured in different adjustments by the ratchet teeth 16 engaging the inner reduced portion of the handle 22. This clamp, shown in Fig. 3, is especially adapted for use in gripping, taking hold of and carrying hot pans and similar articles.

The device above described is extremely simple and of small cost, and in practice has been found highly efficient for the purposes had in view. The clamp furthermore has a large range of adjustability, that is, it is adapted to clamp either very thin or very thick objects.

What I claim is:

1. A clamp of the kind described comprising a pair of members having co-operating clamping jaws, the one having a sliding movement on the other, and a crooked cam lever pivotally connected to said sliding member and working with a cam action through a perforation in the other of said members, substantially as described.

2. A clamp of the kind described comprising a pair of members having co-operating clamping jaws, the one having a sliding movement on the other, and a crooked cam lever pivotally connected to said sliding member and working with a cam action through a perforation in the other member, and having a toothed eccentric portion arranged for interlocking engagement with the said perforated member, substantially as described.

3. In a clamp of the kind described, the combination with the relatively long and relatively short U-shaped rods 2 and 8, having respectively the clamping jaws 3 and 9, of a plate 6 mounted to slide on the legs of said rod 2 and rigidly connected to said rod 8, the bearing plate 4 secured to the bow of said rod 2, and the crooked cam lever 13 pivotally connected to the transverse portion of said rod 8 and having the toothed eccentric portion 12 working through a perforation in said bearing plate 4, substantially as described.

4. The combination with a clamp having co-operating clamping jaws, one of the members of said clamp being in the form of a U-shaped rod, of a strainer having projecting arms 19 formed with hooked ends 20; which arms are adapted to rest upon a portion of said clamp, and which said hooked ends are adapted to engage the legs of the said U-shaped member thereof, substantially as described.

In testimony whereof I affix my signature in presence of two witnesses.

JOHN P. STENSTROM.

Witnesses:
GEO. H. NEWBERT,
W. S. SOUTHWICK.